Patented Aug. 27, 1929.

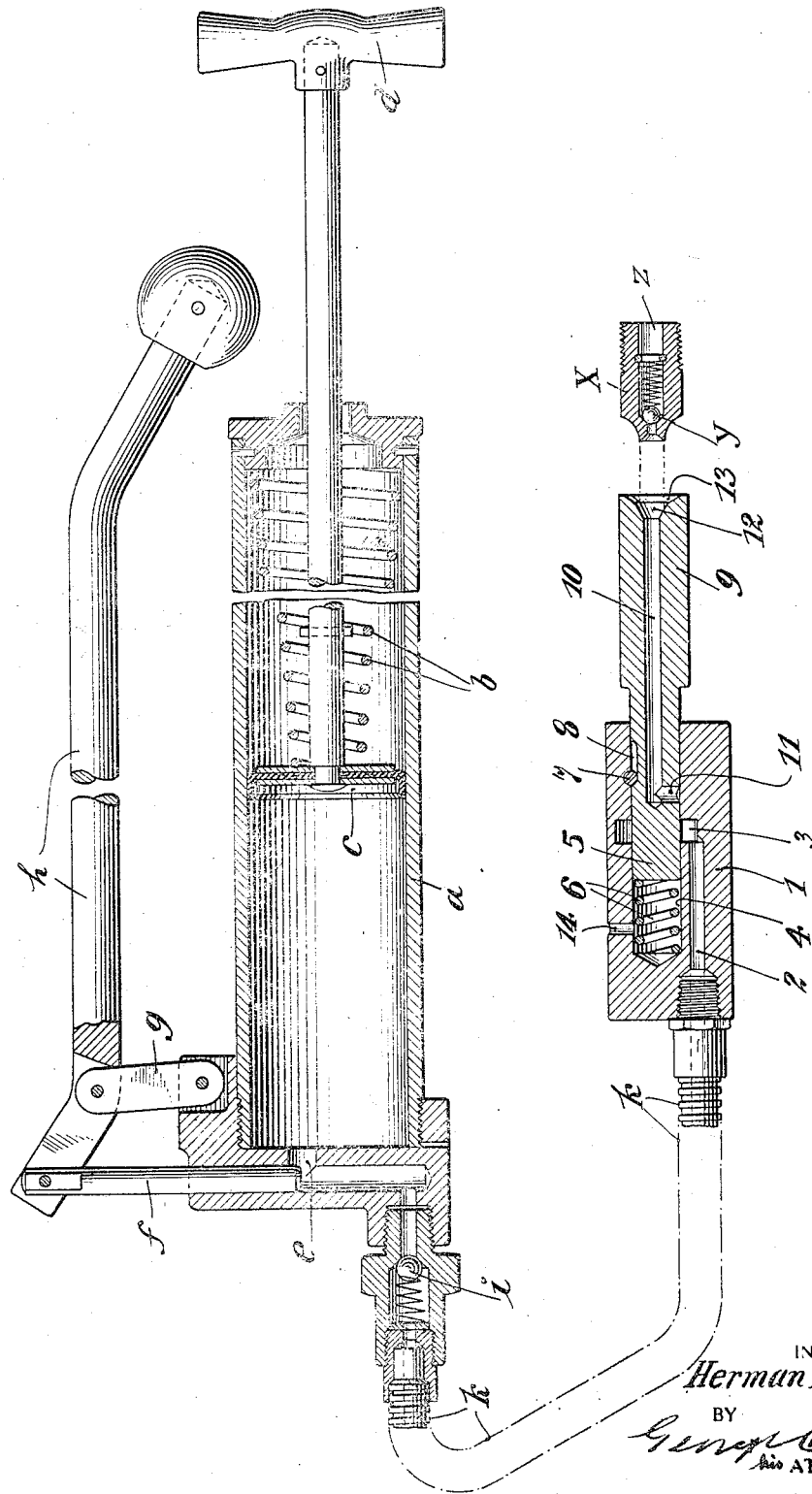

1,725,972

UNITED STATES PATENT OFFICE.

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY.

LUBRICATING APPARATUS.

Application filed April 26, 1926. Serial No. 104,557.

My present invention is shown as embodied in an apparatus that includes a valved nozzle or coupling in combination with a grease gun, for forcing grease through the ducts of bearings on automobiles and other machinery, particularly in cases where the duct inlets are normally closed by nipples having ball inlet check valves, as in expired British patent to Alley and Woodvine, No. 21,893, of 1906, Oct. 4.

My present invention does not necessarily require that the nipples be exteriorly screw-threaded, as in said British patent, or that they be provided with equivalent bayonet joint securing means, as in many other patents, as there are various other forms of nipples and ducts, with and without securing means and valves, for which the novel features of my device may be readily adapted. In fact, a very important feature of my present invention, is its adaptability for forcing grease into a nipple, even against very high resistance, where there is no securing means whatever, the charging nozzle being merely held in face contact with the nipple by very moderate hand pressure.

Such preferred operation, is possible by utilization of high initial velocity and momentum of a column of the grease or other fluid, to shoot it through high resistance obstructions that may block the nipple or lubricating duct. This is a novel application of a principle somewhat analogous to that involved in shooting a tallow candle through a plank, a classical paradox commonly cited in the old text book on physics.

Such operation is possible because of my valved nozzle, pump, flexible hose and other features, whereby high pressure expansive conditions can be built up beforehand, for sudden release at will, in operative relation to the inlet end of the nipple, but it will be obvious that various features of the nozzle, the self-closing valve, the neutral balance of the valve against fluid pressure, etc., can be usefully employed where there is no initial pressure built up or where the entire operation is merely that of pumping a desired quantity of fluid at very low pressure against negligible resistance.

The above and other features of my invention may be more fully understood from the following description in connection with the accompanying drawings, in which The figure shows my complete apparatus, including the pump and valved nozzle or coupling in longitudinal section, ready for application to the end of a grease duct or to a nipple through which the lubricant is to be forced.

The specific source of supply of grease under high pressure is unimportant, but is conventionally indicated as including a reservoir cylinder, $a$, in which grease is pressed forward by spring, $b$, acting through piston, $c$, which latter may be retracted by handle, $d$. The piston force feeds grease into the pump cylinder, $e$, whence it is expelled by single-acting pump plunger, $f$, pivoted on link, $g$, and operated by handle $h$. As shown, the exit of the pump is controlled by ball check valve, $i$, adapted to hold pressure in the flexible hose, $k$, during retracting strokes of the pump plunger.

It will be understood that this means for force feeding the grease is merely illustrative of a high pressure source and, while the plunger, $f$, can be made in proportions capable of delivering the grease at many thousand pounds pressure, there are now available, for use in my present combination, various other pressure feed mechanisms adapted for delivering the grease at higher pressures, up to say 15,000 pounds or 20,000 pounds per square inch, or even higher.

A nipple capable of being supplied with grease in accordance with my invention, is conventionally indicated as comprising a tube, $x$, the inlet end of which may be and usually is provided with a ball check valve, $y$, permitting grease flow to, but preventing reverse flow from, the duct, $z$, through which the grease is to be forced to a bearing not shown.

The nozzle apparatus comprises what may be termed a valve casing member, 1, screw-coupled to the flexible hose, $k$, said member being also useful as a handle for manipulation of the nozzle. The member, 1, is formed with a longitudinal passage, 2, through which the grease is conducted to an annular recess, 3, surrounding a cylindrical bore, 4, in which slides a plunger, 5, normally forced forward to the position shown in the drawings by spring, 6, the movement of the plunger in this direction being limited by key pin, 7, slidably engaged with a groove, 8, in the side of the plunger. The rear end of the plunger is solid, so that in the position shown there is no exit for grease from the annular chamber, 3, and an important feature of the invention is that in this position, pressure on the grease, however great it may be, is perfectly balanced around the periphery of plunger, 5, and being perfectly radial, opposes no resistance whatever to endwise movement of the plunger.

The forward part of the plunger, 9, is formed with an axial passage, 10, having a radial inlet, 11, which is normally closed by the wall of the bore, 4, in which this member slides, but which registers with the supply annulus, 3, whenever the nozzle is forced rearwardly against the pressure of spring, 6. The bore, 10, terminates at the forward end in a flaring cone, 12, adapted for face engagement with the end of the nipple, $x$, said cone being preferably surrounded by a still flatter cone surface, 13, which is useful as an assistance in guiding the nozzle cone, 12, into operative engagement with the end of the nipple.

In any operation of the device, the plunger is a balanced, self-closing valve that stays closed until forced rearwardly by pressure of the cone, 12, against the end of the nipple, that automatically closes when said pressure is removed and that in closing has no tendency to suck back grease from the nozzle. Consequently, the passages, 10, 11, the annulus supply recess, 3, and inlet passage, 4, remain normally filled solid with the grease between successive operations of the device. If there is any remnant pressure on the grease, it is retained by the plunger, 5, acting as a valve.

In the preferred operation, especially where the nipple or duct to be supplied is clogged or offers great resistance, any desired high pressure may be built up in the hose, $k$, and there held between the check valve, $i$, of the pump and the plunger valve, 5, of the nozzle. When this pressure has been accumulated to the desired extent, the nozzle may then be applied to the nipple as before. The sudden expansion thus permitted to the grease will cause the column of grease in passage 10 to be shot at relatively high velocity into the nipple by the pressure of the grease behind it. This pressure may be only the expansion of compressed grease or constituents thereof, such as trapped air, but where a supply metallic hose like $k$, affords space in which the grease is trapped under high pressure, resilient contraction of said hose would supply the necessary high elastic pressure on the grease and would do so even were the grease absolutely incompressible. It will be understood that even when the stored-up pressure is very high, only a small amount of grease will be discharged at the characteristic high velocity, but in practice it will be found that in the case of obstructed grease nipples and ducts, it is only the initial resistance that is high. After this is broken down by the first and highest velocity pressure of the grease, a further charging of the duct can usually be continued by operation of the pump, at much lower pressure. Usually, however, it will be found that after the initial high pressure discharge, there is enough follow up to completely charge an ordinary lubricating duct and bearing without resorting to the pump a second time. In fact, there is likely to be an excess follow up which can be instantly cut off without waste, merely by withdrawing the nozzle from engagement with the nipple.

It will be evident, theoretically at least, that the dynamic pressure thus applied to open the grease duct may be greater than the static pressure on the grease before it was released.

The rear portion of the cylinder 4, where the spring 6 is housed, may be provided with a passage, 14, to permit in and out breathing of air when the head 5 reciprocates and also to permit escape of such small amounts of grease as may leak into this cavity, particularly when the parts become worn or the apparatus is allowed to stand for a considerable time with high pressure on the grease.

I claim:

1. Lubricating apparatus, including a nozzle member having a longitudinal passage connecting an endwise outlet and a lateral inlet, the portion containing said inlet being mounted as a plunger valve slidably fitting the bore of a valve casing member, the sliding surfaces being formed with an annular recess surrounding said plunger, and said valve casing having a supply duct through which grease is delivered into said annulus, the lateral inlet to the nozzle member being maintained normally out of registry with said annular recess by a spring in said bore bearing on the rear end of said plunger to force it forward but permitting it to slide rearwardly into registry therewith when the casing is used as a handle to force the nozzle against the inlet of a lubricating duct.

2. Lubricating apparatus, including means for forcing grease under high pressure into a conduit through a check valve adapted to hold said pressure, said conduit communicating with a nozzle member having a lateral inlet and a longitudinal passage to an endwise outlet, the portion containing said inlet being slidably mounted as a plunger valve that fits the bore of a casing member and the intermediate slide surfaces being formed with an annular recess surrounding said plunger, and said valve casing having a supply duct through which grease is delivered into said annulus and a forwardly acting thrust spring whereby the lateral inlet to the plunger is maintained normally thrust forward out of registry with said annular recess but adapted to slide rearwardly into registry therewith.

3. Lubricating apparatus, including a nozzle member having a longitudinal passage connecting an endwise outlet and a lateral inlet; the portion containing said inlet being mounted as a plunger valve slidably fitting the bore of a valve casing member and said valve casing member having a supply duct having one end arranged to receive grease under pressure and the other to deliver it in registry with the lateral inlet of said plunger, the inlet of the nozzle member being maintained normally out of registry with said supply duct by a spring bearing on said plunger to normally force it forward but permitting it to slide rearwardly into registry with the supply duct when the casing is used as a handle to force the nozzle against the inlet of a lubricating duct.

4. Lubricating apparatus, including a nozzle member having a longitudinal passage connecting an endwise outlet and a lateral inlet, the portion containing said inlet being mounted as a plunger valve slidably fitting the bore of a valve casing member and said valve casing member having a supply duct having one end arranged to receive grease under pressure and the other to deliver it in registry with the lateral inlet of said plunger, the inlet of the nozzle member being maintained normally out of registry with said supply duct by a spring bearing on said plunger to normally force it forward but permitting it to slide rearwardly into registry with the supply duct when the casing is used as a handle to force the nozzle against the inlet of a lubricating duct, and the registering end of at least one of said ducts being formed as an annulus.

Signed at New York city in the county of New York, and State of New York this 22 day of April, A. D. 1926.

HERMAN ALBERTINE.